500
United States Patent [19]

Nikolaou

[11] 4,109,393

[45] Aug. 29, 1978

[54] METHOD FOR THE PRODUCTION OF ELECTRODES FOR LEAD-ACID STORAGE BATTERIES

[76] Inventor: Pavlos Nikolaou, Alicarnassou St. 22, Nea Smyrni, Greece

[21] Appl. No.: 701,879

[22] Filed: Jul. 1, 1976

[30] Foreign Application Priority Data

Jul. 4, 1975 [GR] Greece .................................. 6957

[51] Int. Cl.$^2$ ............................................. F26B 3/04
[52] U.S. Cl. .......................................... 34/22; 34/30; 34/104; 141/1.1
[58] Field of Search ................ 34/22, 26, 29, 30, 105, 34/104, 148, 224; 141/1.1; 29/623.1

[56] References Cited

U.S. PATENT DOCUMENTS

| | | | |
|---|---|---|---|
| 1,806,180 | 5/1931 | Reinhardt | 34/23 |
| 2,066,701 | 1/1937 | Smith et al. | 34/23 |
| 2,481,218 | 9/1949 | Hindall | 141/1.1 |
| 2,880,520 | 4/1959 | Ellis et al. | 34/29 |
| 2,911,457 | 11/1959 | Sabatino et al. | 34/224 |
| 3,314,158 | 4/1967 | Carson et al. | 34/105 |
| 3,413,728 | 12/1968 | Tiegel et al. | 34/26 |
| 3,499,228 | 3/1970 | Port | 34/22 |
| 3,556,852 | 1/1971 | Haebler | 34/22 |
| 3,918,989 | 11/1975 | Gillman | 141/1.1 |
| 3,943,002 | 3/1976 | Scheuerle | 34/22 |
| 4,029,132 | 6/1977 | Jackovitz et al. | 141/1.1 |

*Primary Examiner*—John J. Camby
*Assistant Examiner*—Larry I. Schwartz
*Attorney, Agent, or Firm*—Haseltine, Lake & Waters

[57] ABSTRACT

A method for the production of lead-acid storage batteries having a grid of lead alloy filled with active materials consisting of lead oxides, lead powder, sulphuric acid and water wherein the electrodes are subjected to a jet of an inert gas at a high temperature and velocity for several seconds to dry the surface of the electrodes while leaving the interior thereof moist.

6 Claims, No Drawings

METHOD FOR THE PRODUCTION OF ELECTRODES FOR LEAD-ACID STORAGE BATTERIES

FIELD OF THE INVENTION

The invention relates to methods for the production of electrodes for lead-acid storage batteris.

BACKGROUND

The electrodes, i.e. plates of lead-acid storage batteries consist usually of a grid of lead alloy, which is filled with the active materials. The active materials are a paste consisting mainly of lead oxides, lead powder, sulphuric acid and are subjected to a partial drying, following which they are stored, in contact with each other, in order to allow chemical reactions to take place between the constituents of the paste, these reactions being essential for obtaining electrodes of the required quality.

The drying operation before storage is necessary for preventing the danger of sticking between electrodes. However, according to the results of modern research, the drying should be limited only to the surface of the electrodes, without any reduction of the water content inside the electrode. Otherwise, the fundamental chemical reactions during storage cannot be insured, resulting in a reduction both of the mechanical strength and the life of the electrodes.

According to a known, widely used method, the electrodes are conveyed through a tunnel oven kept at a temperature which insures, within a few minutes, the removal of water necessary to enable the electrodes to be stored in contact with each other without sticking. The application of this method showed that it is practically impossible to avoid the removal of moisture at great depths resulting both in a reduction of the water content inside the electrodes and in the formation of cracks. Furthermore, the removal of moisture is uneven, leading to the formation of areas of significantly different water content in the electrodes. Another disadvantage of the Brown method is that any irregularity in the feed rate creates intense variations of the drying conditions. Finally, the machinery necessary for the application of the method is bulky as the length of the tunnel is up to 7m.

Another known method (Greek Pat. No. 32591), according to which the electrodes are fed between one or more pairs of heated metal rolls, fulfills the requirement of even removal of surface humidity, but presents the following disadvantages:

The machinery for the application of the method requires complicated and tedious adjustment and has a tendency to frequent breakdowns.

The method requires a high uniformity in the thickness of the electrodes to be treated.

Any small irregularity in the thickness or flatness of any electrode results in jamming and creates a high amount of rejects.

If the thickness of the electrodes is higher than the thickness of the grids because of a surplus of active material (so-called "overpasting"), drying with the heated rolls method is practically impossible.

SUMMARY OF THE INVENTION

An object of the invention is to obviate the disadvantages of the methods of the prior art by providing a simplified method in which reliable and uniform moisture conditions are retained throughout the electrode while uniform surface drying is obtained.

According to the invention, the electrodes are exposed to a jet of high speed air or gases for a short period of time of the order of several seconds at a temperature of between 50° and 900° C.

The method has the following advantages:

Due to the very short exposure, the drying is truly superficial and the electrodes are absolutely free of cracks, although the electrodes are dry enough on the surface to allow them to be brought in contact without sticking.

The drying is uniform on the entire surface of the electrodes.

The necessary equipment for carrying out the application of the method is of low cost, simple construction and is reliable in operation.

No adjustment is needed for the treatment of electrodes of varying thicknesses.

"Overpasted" and even severely buckled electrodes may be dried without any difficulty or drawback.

Adjustment for the width of the electrodes as well as for the degree of drying, feed rate etc. are easy and simple.

DESCRIPTION OF PREFERRED EMBODIMENTS

Conventional battery electrodes ready for drying and comprising a grid of lead alloy filled with active material consisting of lead oxides, lead powder, sulphuric acid and water were subjected to drying by directing a jet of hot air at a temperature of 700°C. and a velocity of 4m/sec for periods less than about 10 seconds against the electrodes. The thus dried electrodes were found to be dry at the surface while retaining moisture in the bodies thereof and could be stored without sticking while the necessary chemical reactions between the constituents of the paste can be obtained.

It is also possible, in order to obtain absolute uniformity of drying on the entire surface of the electrodes, to expose them successively to two jets of hot air or gases, having opposite directions.

While the invention has been described hereinabove with reference to a specific embodiment it has been found that the parameters for a successful drying of the surface of the electrodes while retaining moisture in the body are variable and can be appropriately determined by a routine artisan. It has been found, however, that the temperature of the jet of air or inert gases should be between 500° and 900°C and the exposure of the air to the electrodes should take place in less than ten seconds when the velocity of the flow is 4m/sec.

Numerous modifications and variations of the specific disclosed embodiment will become evident to those skilled in the art without departing from the scope and spirit of the invention as defined in the attached claims

What is claimed is:

1. A method for the production of lead-acid storage battery electrodes having a grid of lead alloy filled with active materials, consisting essentially of lead oxides, leadpowder, sulphuric acid and water, said method comrising exposing said electrodes to a jet of a gas at 500° to 900°C at a velocity of the order of several meters per second for a time of the order of a few seconds, the time and temperature being related whereby the electrodes are processed without being destroyed to dry the surface of the electrodes while leaving the interior moist, and storing the thus superficially dried electrodes to allow the active materials to react chemically to produce the final electrodes, the electrodes being sufficiently dry to allow them to be brought into contact during storage without sticking.

2. A method as claimed in claim 1, wherein the electrodes are exposed successively to jets of hot gases in different directions.

3. A method as claimed in claim 1, wherein said gas is air.

4. A method as claimed in claim 1, wherein said air is directed at the electrodes at a velocity of 4m/sec.

5. A method as claimed in claim 4 wherein the air is directed at the electrodes for less than 10 seconds.

6. A method as claimed in claim 1 wherein the gas is directed at the electrodes for less than 10 seconds.

* * * * *